Feb. 21, 1967    SHYH WANG    3,305,685
SEMICONDUCTOR LASER AND METHOD
Filed Nov. 7, 1963    2 Sheets-Sheet 1

INVENTOR.
SHYH WANG
BY
ATTORNEYS

Feb. 21, 1967      SHYH WANG      3,305,685
SEMICONDUCTOR LASER AND METHOD
Filed Nov. 7, 1963                 2 Sheets-Sheet 2

INVENTOR.
SHYH WANG
BY
Flehr and Swain
ATTORNEYS

> # United States Patent Office

> 3,305,685
> Patented Feb. 21, 1967

3,305,685
SEMICONDUCTOR LASER AND METHOD
Shyh Wang, Berkeley, Calif., assignor to The
Regents of the University of California
Filed Nov. 7, 1963, Ser. No. 322,150
11 Claims. (Cl. 250—199)

This invention relates generally to semiconductor lasers and more particularly to lasers employing germanium and germanium-like semiconductor materials.

Laser action in gallium arsenide (GaAs) diodes biased in the forward direction has been recently observed. In gallium arsenide, the bottom of the conduction band and the top of the valence band occur at the same value of the wave number $k$, (000), which is the center of the Brillouin zone. Therefore, electrons and holes under equilibrium conditions are located near the (000) valley of the conduction and valence bands, respectively. When excess electrons and holes are injected into the base region of the GaAs diode, the excess carriers will have the same value of $k$.

In an optical transition, it is required by wave mechanics that the total momentum should be conserved, the momentum being equal to $h/2\pi$ (Plank's constant divided by $2\pi$) multiplied by the wave number $k$. Since the wave number $k$ associated with photons is much smaller than that associated with electrons in a crystalline lattice, the momentum conservation law reduces to $k_i = k_f$ where $k_i$ and $k_f$ are the initial and final wave numbers of the electrons involved in the direct optical transition. In semiconductors like GaAs where the electrons and holes have the same value of $k$, generation or recombination of excess carriers may result in direct adsorption or emission of radiant energy. Such processes are illustrated in FIGURE 1 and will be described in more detail hereinafter.

In semiconductors like germanium, however, the bottom of the conduction band occurs at a different value of the wave number $k$ than the top of the valence band. To make an optical transition across the band, electrons and holes must be scattered by lattice phonons to obtain a proper momentum value. This is illustrated in FIGURE 2 and will be described in more detail hereinafter. Therefore, ordinary adsorption or emission of photons in germanium-like semiconductors is indirect or phonon assisted. This fundamental difference in the band structure of GaAs and germanium-like semiconductors explains why intense recombination radiation has been observed in GaAs diodes but not in germanium.

In lasers employing GaAs, the wave length and intensity of the radiation is not readily controlled. Furthermore, such lasers have poor mode stability.

It is a general object of the present invention to provide a semiconductor laser and method employing germanium-like semiconductor material.

It is a further object of the present invention to provide a semiconductor laser and method in which the amplitude and frequency of the radiant energy may be separately modulated or controlled.

It is a further object of the present invention to provide a semiconductor laser and method employing covalent semiconductors where the top of the valence band and bottom of the conduction band do not occur at the same value of momentum.

It is a further object of the present invention to provide a semiconductor laser in which electrons are tunneled into the (000) valley of the conduction band and holes are injected into the (000) peak of the valence band.

It is still a further object of the present invention to provide a semiconductor laser and method in which tunneling provides electrons to the (000) valley of the conduction band and another mechanism such as avalanche or injection provides holes in the (000) peak of the valence band.

The foregoing and other objects of the invention will become more clearly apparent from the following description when taken in conjunction with the accompanying drawing.

Referring to the drawing.

Figure 5:
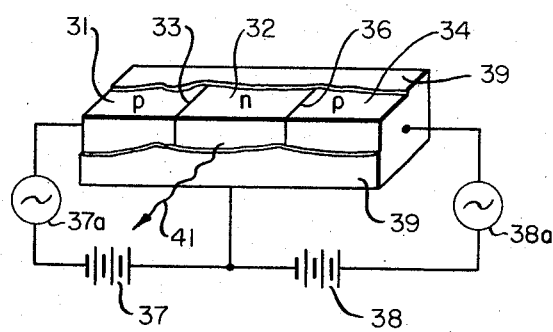
Figure 11:
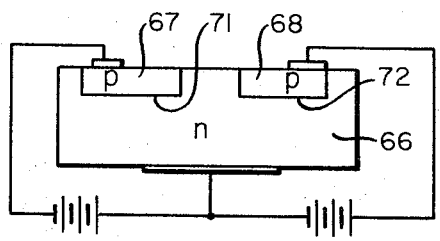
Figure 3:
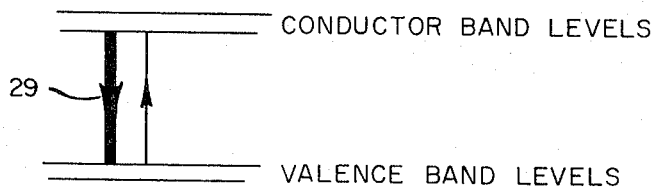
Figure 4:
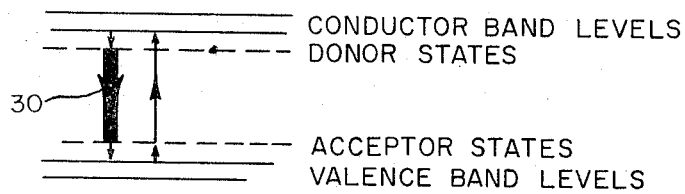
Figure 6:
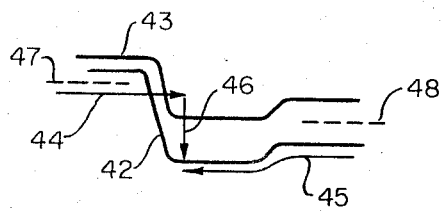
Figure 7:
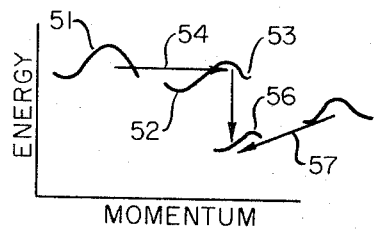
Figure 8:
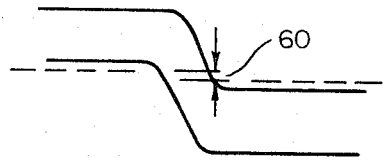
Figure 9:
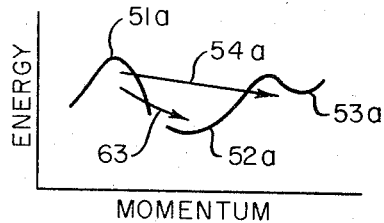
Figure 10:
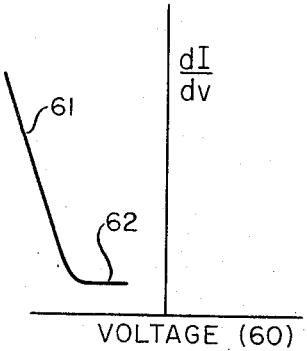
Figure 12:
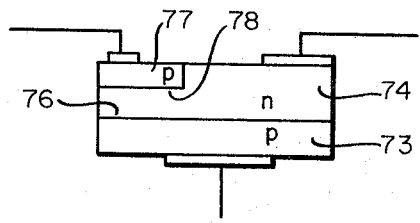

FIGURE 3 schematically illustrates the transition, due to population inversion, between the electrons in the conduction and valence band;

FIGURE 4 illustrates the transition, due to population inversion, between donor and acceptor states;

FIGURE 5 schematically illustrates a laser incorporating the present invention;

FIGURE 6 shows the energy-band diagram for the laser of FIGURE 5 plotted as a function of distance;

FIGURE 7 shows the energy-band diagram for the device of FIGURE 5 plotted as a function of momentum for the various portions of the device of FIGURE 5;

FIGURE 8 shows the energy-band diagram as a function of distance for the tunnel junction;

FIGURE 9 illustrates the tunneling of electrons into the (000) valley of the conduction band for the tunnel junction;

FIGURE 10 shows the conductance of the tunnel junction;

FIGURE 11 shows another configuration of a laser in accordance with the invention; and FIGURE 12 shows still another configuration of a laser in accordance with the invention.

Figure 1:
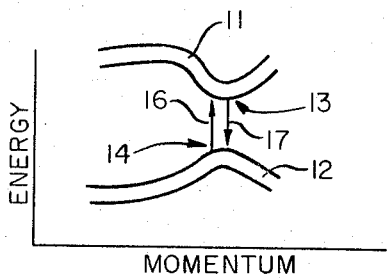
FIGURE 1 shows the energy-band diagram for GaAs plotted as a function of momentum.

FIGURE 1 shows the energy-band momentum diagram for GaAs. The upper energy band 11 represents the conduction band, while the lower band 12 represents the valence band. The bottom or valley of the conduction band occurs at the momentum corresponding to the wave number $k=(000)$ illustrated by the valley 13. The top of the valence band occurs at the same wave number and is illustrated by the peak 14. Since the peak of the valence band and valley of the conduction band occur at the same wave number, generation or recombination of excess carriers may result in direct adsorption or emission of energy. The arrow 16 illustrates the adsorption of radiant energy and inversion of population. The arrow 17 illustrates the reverse process, or reversion of population. GaAs laser comprises a diode which is forward biased to inject electrons and holes into one of the regions forming the junction whereby to provide the necessary population inversion required for emission of photons.

Figure 2:
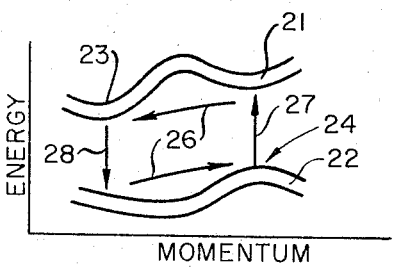
FIGURE 2 shows the energy-band diagram plotted as a function of momentum for germanium.

In semiconductors like germanium, however, injection alone is not enough for the laser action. Referring to the energy-band diagram, FIGURE 2, there is shown the conduction band 21 and valence band 22 for germanium. It is noted that the bottom or valley of the conduction band occurs at the point 23 which corresponds to a wave number $k(111)$ and is not the same as the wave number for the top or peak of the valence band which occurs at the wave number $k=(000)$. Thus, under normal conditions, all the free electrons in germanium are located at near the conduction band minimum 23 while practically all of the holes are located near the center of the Brillouin zone of the valence band 22, the peak 24. Consequently, a band to band recombination process has to be phonon assisted or indirect. The arrows 26 represent the absorption or emission or phonons. The arrow 27 represents the absorption of photons resulting from electrons being excited into the conduction band and phonon assisted to the valley 23. The arrow 28 represents the emission of photons resulting from the transfer of electrons from the conduction band to the valence band and phonon assisted to the peak of the valence band.

FIGURES 3 and 4 are illustrative of the laser levels which may occur simultaneously in a semiconductor laser device. FIGURE 3 shows a population inversion of electrons in the conduction band and valence band to provide a non-equilibrium condition, and thus radiation as indicated by arrow 29. FIGURE 4 shows population inversion between the donor and acceptor states to establish a non-equilibrium condition, and thus radiation as indicated by arrow 30.

Referring now more specifically to FIGURE 5, there is shown a semiconductor device including first and second regions 31 and 32 forming a first p-n junction 33, and a third region of semiconductor material 34 forming with the region 32 a p-n junction 36. Assuming that the regions 31 and 32 are heavily doped, that is, that they have a high concentration of unbalanced impurities, then it is possible by reverse biasing the junction 33 to cause tunneling of majority electrons into the n-type region 32. Forward bias applied to the junction 36 causes minority carriers, holes, to be injected into the n-type region 32. Suitably connected voltage sources are schematically illustrated by the batteries 37 and 38. The side surfaces of the device are provided with a reflective coating 39 which forms the resonant chamber for setting up the laser oscillations for the electron-photon interaction. The arrow 41 illustrates the emitted energy.

Referring to FIGURE 6, there is shown the upper edge 42 of the valence band and the lower edge 43 of the conductance band plotted as a function of distance for the device illustrated in FIGURE 5. The energy bands are shown with the applied bias. The arrow 44 illustrates the tunneling of electrons into the zone 32, while the arrow 45 illustrates the injection of holes into the same region. Direct radiative recombination takes place as indicated by the arrow 46. The dotted lines 47 and 48 show the Fermi levels.

FIGURE 7 shows energy-bands as a function of momentum for the various regions of the device of FIGURE 5. It is seen that the upper edge of the valence band 51 $[k=(000)]$ of the region 31 is raised above both the minimum value of the conduction band 52 $[k=(111)]$ for the region 32, but also above the valley 53 $[k=(000)]$ of the conduction band for the region. Electrons, therefore, can tunnel past valley 52 into valley 53, as indicated by arrow 54, where they have the proper momentum to combine with the holes being injected from the p-type region 34 into the peak 56 $[k=(000)]$ of the valence band as indicated by the arrow 57. Since the holes and electrons have the same momentum, there can be direct radiative recombination. The mechanism involved can be either due to recombination from valence and conduction states or from donor and acceptor states, or both.

In order for the electrons to reach the (000) valley, they must not be scattered into the (111) valley. Thus, the n-type region must be of such dimensions and include such impurities as to assure that the scattering does not prevent tunneling of electrons into the (000) valley 53. Two types of scattering may be involved: (1) phonon scattering and (2) impurity scattering.

An estimate of the magnitude of the mean free path of the tunneling electrons can be obtained from optical absorption data. Calculations show that the mean free path of the electrons due to phonon scattering is in the order of $2 \times 10^{-4}$ cm., which corresponds to an inter-valley scattering time of $6 \times 10^{-12}$ sec. at 77° K. This corresponds generally to the base width of a 1000 mc. transistor which is $10^{-4}$ cm. or less. Thus, the problem of phonon scattering can be met by making the base width sufficiently small.

Impurity scattering is attributed to the impurity admixture of the (000) valleys and the various (111) like valley states due to the impurity cell potentials. Among the three substances, antimony, phosphorus and arsenic, which have been investivated, antimony has a much smaller scattering cross-section than the other two. Referring to FIGURES 6 and 7, direct tunneling to the (000) valley of the conduction band sets in only after the bias voltage applied is greater than the difference in voltage between the Fermi level and the (000) band voltage. Below this voltage, indirect tunneling is possible with the assistance of phonon or impurity scattering. Recent work has shown that phonon scattering is much more important than impurity scattering in germanium doped with antimony. It is, therefore, preferable to use antimony as the dopant for the n-type region to thereby minimize the impurity scattering.

From the above, it can be seen that a structure which operates in the manner described can be made. With diffusion techniques, base widths of less than $10^{-4}$ cm. can be easily achieved. The impurities can be such that impurity scattering is minimized.

The next question is how direct recombination of electrons and holes can be enhanced to increase the radiation output and efficiency. The sooner the levels between which direct recombination and radiation takes place become totally occupied or totally empty, the lower is the threshold current density at which efficient radiation begins. The donor and acceptor states are believed to be more efficient laser levels than conduction and valence band states.

To show how shallow donor and acceptor states can play a part in the direct recombination process, a review of the structure of these states is in order. Since the effective mass theory has been very successful in explaining the energies of these states and the results of optical absorption and spin resonance experiments, we shall quote the relevant conclusions derived from that theory. First, the electron wave function for the shallow states extends over several thousand crystal cells. As a matter of fact, it has been shown that for an impurity concentration greater than $5 \times 10^{16}$ per cc., electrons can jump from impurity to impurity, and the impurity states begin to form a band which overlaps the conduction or valence band. Furthermore, for a doping concentration of impurities greater than $10^{18}$ per cc., there is a considerable overlap in the electron wave function of the shallow donor and acceptor states. Secondly, the wave function of these shallow states can be expressed as a linear combination of the electron wave function near the respective band minima. Thus, the electrons in these shallow states have the same value of $k$ as the electrons in the respective valleys of the conduction and valence bands.

From the above discussion, it can be concluded that if the doping concentration is reasonably high, there can be donor to acceptor state transition as well as conduction to valence band transition. The donor to acceptor state transition may be the dominant one simply because the shallow donor and acceptor states become fully occupied and empty before the conductor and the valence band states.

Considering donor to acceptor state transition, the net output of radiation power is equal to $$\overline{W} = P(d \rightarrow a) N_d \Delta P_a (E_d - E_a)$$

where $P(d \rightarrow a)$ denotes the transition probability from the donor to the acceptor states induced by photons; $N_d$ is the density of donors; $\Delta P_a$ is the injected hole concentration in the acceptor state; and $E_a$ and $E_d$ are the energies of the acceptor and donor states respectively.

This shows that the output is controlled by the availability of holes. This equation also predicts a linear relationship between the light output and the injected current. Thus, the bias on the injection junction can be used to modulate the amplitude of the laser output as by connecting the injection junction to the source 38 through a modulator 38a.

The tunnel junction can serve another function beside that of tunneling. The effect on the energies of shallow impurity states is measurable. For example, for a field of 3000 volts/cm., it has been estimated that a second-order or Stark shift of $5 \times 10^{-5}$ electron volt takes place. In a reversely biased tunnel diode, an electric field as high as $10^5$ volts/cm. can be obtained. It may be worthwhile to give an order of magnitude estimate of the effect. The second-order effect is proportional to the square of the electric field. Hence, for a change of electric field of $10^3$ volts/cm. at a field of $10^5$ volts/cm., we can obtain a shift in energy of the shallow states of $10^{-3}$ electron volts. To get a one tenth of one percent change in the frequency of the emitted radiation, we need only to change the bias voltage by one percent. Such a small change in the bias voltage should not produce any significant change in the amplitude of the radiation output. Thus, the frequency of the laser output may be modulated by modulating the reverse bias voltage as by connecting the tunneling junction to the source 37 through a modulator 37a.

It should be added that the frequency of a laser is determined by the resonant mode, that is, dimension, of a resonator. Therefore, the amount of frequency modulation allowed without suffering severe amplitude deterioration is actually limited by the quality factory, Q, of the resonant structure.

The proposed two-stage (tunneling and injection) scheme for laser action can be applied to other germanium-like semi-conductors where the conduction band minimum and the valence band maximum do not occur at the same value of $k$.

There are certain loss mechanisms associated with the proposed laser; first, losses in the tunnel diode. The conduction of the tunnel diode is shown schematically in FIGURE 10. The applied voltage is shown at 60 on the energy diagram of FIGURE 8. The sharp increase in conductance as indicated by the portion 61 of the curve corresponds to the onset of direct tunneling, while the portion 62 corresponds to phonon assisted tunneling. It is in the direct tunneling region 61 in which the tunnel diode is operated. For germanium, this is around 0.1 electron volt. However, it is noted that before direct tunneling sets in, there is a current into the (111) valley due to indirect tunneling through phonon and impurity scattering as shown by the arrow 63 in FIGURE 9. The other reference numerals 51a, 52a, 53a and 54a have the same meaning as the numbers 51, 52, 53 and 54 of FIGURE 7. This component of current constitutes a real loss. To cut down the indirect tunneling process, it is necessary to operate the proposed scheme at a low temperature and to use impurities which give the least admixture of conduction band states. If the voltage for direct tunneling is relatively large, say beyond one electron volt, the loss due to indirect tunneling may become prohibitively large before direct tunneling sets in.

There is also a loss associated with the injection junction. The component of current due to injection of electrons into the right-hand region 34 is entirely wasteful. To reduce this component, there needs to be a greater impurity concentration in the base region 32 so that the tunnel junction side is heavily doped while the injection junction side is relatively lightly doped. The base width should be small compared to the mean free path of the (000) valley electrons. Recombination of the injected holes with the electrons in the (111) valley of the conduction band should be minimized. As previously described, the above requirements can be met with present day techniques.

Another loss is the re-absorption of carriers. This loss can be calculated from optical absorption data. Calculations indicate that re-absorption of carriers raises the population inversion requirement for oscillation by about 25 percent.

The device described need not have separate control of bias for the tunnel and injection junctions, only the outer regions need be contacted to provide a floating n-type region. In this case, the impurity concentration of the various regions is established at a level such that the injected hole concentration roughly matches the tunnel electron concentration.

A variation of the present scheme, probably a less efficient one, is to operate a diode in a region in which both tunneling and avalanche mechanisms are significant and equally important. The former mechanism serves to supply the right kinds of electrons for the (000) valley, while the latter furnishes the necessary holes in the direct radiative recombination process.

The laser illustrated in FIGURE 5 comprises a plurality of adjacent regions in the form of layers to define the junctions 33 and 36. The device of FIGURE 5 can be constructed by diffusion, rate growing and other well known techniques. Lasers may also be made by diffusion of inset p-type regions into an n-type block of material such as illustrated in FIGURE 11. Thus, the n-type base region 66 has inset therein spaced p-type regions 67 and 68 which form therewith the tunneling junctions 71 and injection junctions 72, respectively.

FIGURE 12 illustrates another configuration of device which includes two regions 73 and 74 forming an injection junction 76 with an inset region 77 forming the tunneling junction 78.

It is apparent that many configurations can be made with known techniques.

Thus, there is provided a laser employing germanium-like semiconductor materials in which the top of the valence band does not occur at the same momentum as the bottom of the conduction band in which the population inversion is achieved by tunneling carriers into one region so that they achieve a momentum in the conduction band corresponding to the momentum of the valence band, and simultaneously providing in the valence band carriers for recombination therewith. The laser of the present invention can be modulated both as to intensity or amplitude of radiation, and frequency or wave length.

I claim:
1. The method of causing emission of photons in a region of semiconductor material of the type in which the bottom of the conduction band does not occur as the same momentum at the top of the valence band which comprises introducing majority carriers with a momentum corresponding to that of the top of the valence band into the conduction band of said region, and simultaneously introducing minority carriers into the valence band of said region whereby said majority and minority carriers can undergo band-to-band radiative recombination.

2. The method of causing emission of photons in a region of semiconductor material of the type in which the bottom of the conduction band does not occur at the same momentum as the top of the valence band which comprises tunneling majority carriers with a momentum corresponding to that of the top of the valence band into the conduction band of said region, and simultaneously introducing minority carriers into the valence band of said region whereby said majority and minority carriers can undergo band-to-band radiative recombination.

3. The method of causing emission of photons from one region of a semiconductor device having at least first and second regions of semiconductor material of opposite conductivity type forming a p-n junction which comprises tunneling majority carriers from the p region into the n region, and independently providing minority carriers in said other region whereby said carriers can undergo band-to-band radiative recombination.

4. The method of causing photon emission in a region of semiconductor material bounded by adjacent regions of semiconductor material of opposite conductivity, the adjacent regions forming first and second rectifying junctions with the first region, said first region being of a type in which the bottom of the conduction band does not occur at the same momentum value as the top of the valence band, comprising applying a reverse bias voltage across one junction to cause tunneling of electrons across the junction and into the first region at a momentum value corresponding to the top of the valence band, and applying a forward bias to the other junction to cause injection of holes into said first region so that direct band-to-band radiative combination of the electrons and holes can occur to cause emission of photons.

5. The method as in claim 4 wherein the voltage applied to the first junction is modulated to modulate the frequency of the emitted photon energy.

6. The method as in claim 4 wherein the voltage applied to the second junction is modulated to modulate the amplitude of the emitted photon energy.

7. In a semiconductor laser, first, second and third regions with adjacent regions being of opposite conductivity type to form two rectifying junctions, the junction at said first and second regions having a high concentration of impurities and the junction at said second and third regions having a lower concentration of impurities, means for applying a reverse voltage to the first junction to cause tunneling through said junction, means for applying a forward voltage to said second junction to cause injection, and means forming an optically resonant cavity about said second region.

8. A semiconductor laser as in claim 7 wherein the portion of the second region separating said first and third regions has a width of less than $10^{-4}$ cm.

9. A semiconductor laser as in claim 7 in which said second region is antimony doped n-type germanium.

10. A semiconductor laser comprising a body of semiconductor including means forming an optically resonant cavity, said semiconductor being of a type in which the bottom valley of the conduction band and the top peak of the valence band occur at different values of momentum, means for introducing electrons with a momentum value corresponding to the top peak of the valence band into the conduction band, means for introducing a substantial number of holes into the valence band so that direct band-to-band recombination between the electrons and the holes can take place and photon emission occur.

11. A laser according to claim 10 in which said semiconductor is doped with an impurity having a relatively low scattering cross-section for electrons to thereby minimize impurity scattering of the electrons.

References Cited by the Examiner
UNITED STATES PATENTS

| | | | |
|---|---|---|---|
| 3,053,998 | 9/1962 | Chynoweth et al. | 307—88.5 |
| 3,059,117 | 10/1962 | Boyle et al. | 250—199 X |
| 3,060,327 | 10/1962 | Dacey | 307—88.5 |
| 3,105,177 | 9/1963 | Aigrain et al. | 307—88.5 |
| 3,121,203 | 2/1964 | Heywang | 250—199 X |
| 3,245,002 | 4/1966 | Hall. | |

OTHER REFERENCES

Harris, Electronic Technology, vol. 39, No. 3, Mar. 1962, pp. 86–94.

Dumke, Physical Review, vol. 127, No. 5, Sept. 1, 1962, pp. 1559–1563.

Pankove et al., Proc. I.R.E., vol. 50, No. 9, September 1962, pp. 1976–1977.

DAVID G. REDINBAUGH, *Primary Examiner.*

JOHN W. CALDWELL, *Examiner.*